Patented Aug. 25, 1936

2,052,386

UNITED STATES PATENT OFFICE 2,052,386

ZINC DERIVATIVES OF DIAZO SALTS AND A PROCESS OF MAKING THEM

Alfred Davidson, Crumpsall, and William Galloway Reid, Derby, England, assignors to Imperial Chemical Industries Limited, Westminster, England No Drawing. Application April 5, 1932, Serial No. 603,444. In Great Britain April 8, 1931

7 Claims. (Cl. 260—11)

This invention relates to the preparation of new stable diazo compounds, and more particularly refers to the production of zinc chloride addition compounds.

According to the invention it has been found that it is possible to prepare new stable dry diazo compounds from compounds of the general formula:

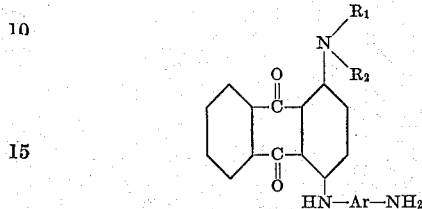

wherein $R_1$ represents alkyl, $R_2$ represents hydrogen or alkyl, and —Ar— represents a para-arylene radical and wherein the anthraquinone residue may be further substituted, by diazotizing the same and adding to the diazo solutions a zinc salt, salting out if necessary, separating the precipitate and drying it.

The new stable diazo salts may be dried by heat, for example, at 40–45° C., or they may be mixed while moist with an appropriate amount of a partially or totally dehydrated salt which normally crystallizes with water of crystallization and a dry mixture so produced.

The invention is illustrated, but not limited, by the following examples, in which the parts are by weight.

Example 1

34.3 parts of 1-methylamino-4-p-aminoanilino-anthraquinone are suspended in 1000 parts of water containing 50 parts of hydrochloric acid of 36% strength. The suspension is heated to the boil and is cooled to 5° C. by the addition of 3000 parts of ice. Diazotization is then effected by the gradual addition of a solution of 6.9 parts of sodium nitrite in 50 parts of water. The deep green solution is filtered from insoluble material and to the filtrate is added a solution of 15 parts of zinc chloride in 50 parts of water. The diazo zinc salt is salted out by the addition of 300 parts of common salt, filtered, and washed free from mineral acid by means of 10% brine. The paste is then dried in the oven at 40–45° C.

The formula for this product is probably as follows:

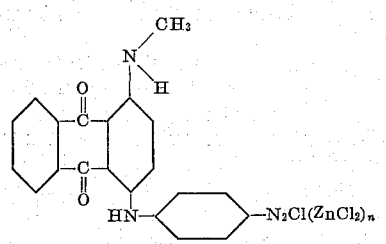

wherein $n$ represents the number of molecules of zinc chloride which adds to the anthraquinone derivative.

Example 2

34.3 parts of 1-methylamino-4-p-aminoanilino-anthraquinone are dissolved in 200 parts of sulphuric acid of 96% strength, 250 parts of ice are added and diazotization is effected by the addition of 6.9 parts of sodium nitrite dissolved in 50 parts of water. A solution of 15 parts of zinc chloride in 50 parts of water is added and the precipitated diazo zinc salt is filtered off and washed free from mineral acid with 10% brine. The washed paste may be redissolved in water for the removal of insoluble material by filtration, and the diazo double salt again isolated by salting out and filtering. It is then intimately mixed with sufficient anhydrous sodium sulphate to give a dry mixture.

The formula for this product is probably as follows:

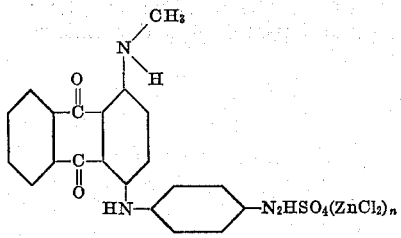

wherein $n$ represents the number of molecules of zinc chloride which adds to the anthraquinone derivative.

*Example 3*

35.9 parts of 1-dimethylamino-4-p-aminoanilinoanthraquinone are dissolved in 1000 parts of water containing 25 parts of 36% hydrochloric acid. The solution is cooled to below 10° and 6.9 parts of sodium nitrite are added. When diazotization is complete a solution of 15 parts of zinc chloride in 50 parts of water is added. The precipitated double salt is filtered off and from it is made a dry mixture adapted for use in the preparations of solutions, etc., for dyeing and printing as described in Example 2.

The formula of this compound is probably:

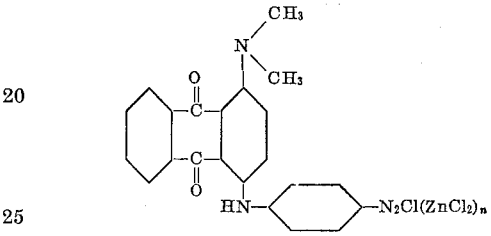

wherein $n$ represents the number of molecules of zinc chloride which adds to the anthraquinone derivative.

1-methylamino-4-p-amino-2':5'-dimethoxy-anilino-anthraquinone, 2-bromo-1-methylamino-4-p-aminoanilino-anthraquinone, and 1-methylamino-4-p-amino-3'-chloranilino-anthraquinone, all obtained by the general method described in British Patent No. 315,905 are further examples of compounds from which stable dry diazo compounds are obtained in accordance with the invention.

We claim:

1. A process for the manufacture of new stable diazo compounds by adding zinc chloride to a diazo solution obtained by diazotizing a compound of the general formula

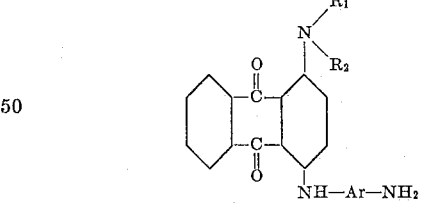

wherein $R_1$ represents alkyl, $R_2$ represents hydrogen or alkyl and —Ar— represents a paraphenylene radical, separating the precipitate and drying it.

2. A process for the manufacture of stable diazo compounds which comprises adding zinc chloride to a diazo solution obtained by diazotizing 1-methylamino-4-p-amino-anilino-anthraquinone.

3. A stable diazo compound having the following general formula:

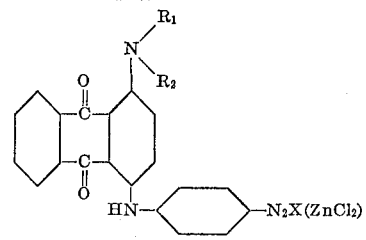

wherein $R_1$ represents an alkyl group, $R_2$ represents hydrogen or an alkyl group, and X represents a mineral acid radical.

4. A stable diazo compound having the following probable formula:

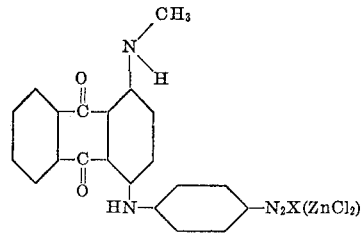

wherein X represents a mineral acid radical.

5. A compound having the formula:

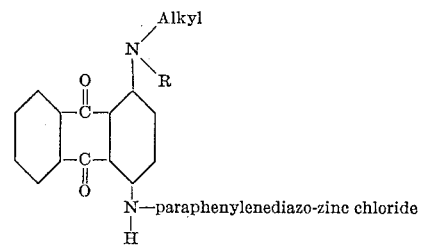

in which R is hydrogen or alkyl.

6. A process of producing a stable diazo compound which comprises diazotizing a compound having the formula

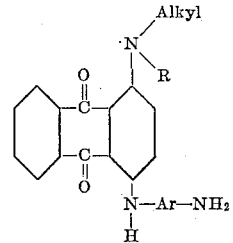

in which R is H or alkyl and Ar is a paraphenylene radical, and combining the diazotized compound with zinc chloride.

7. A compound of anthraquinone having in position 1 a methyl amino group and in position 4 a paraaminoaniline diazotized and coupled to zinc chloride.

ALFRED DAVIDSON.
WILLIAM GALLOWAY REID.